(12) United States Patent
Vinogradov et al.

(10) Patent No.: US 10,514,524 B2
(45) Date of Patent: Dec. 24, 2019

(54) IMAGING DEVICES HAVING PROGRESSIVE MAGNIFICATION

(71) Applicant: SYMBOL TECHNOLOGIES, LLC, Lincolnshire, IL (US)

(72) Inventors: Igor Vinogradov, Oakdale, NY (US); David T. Shi, Setauket, NY (US); Joseph D. Giordano, Bayville, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 48 days.

(21) Appl. No.: 15/720,307

(22) Filed: Sep. 29, 2017

(65) Prior Publication Data

US 2019/0101721 A1    Apr. 4, 2019

(51) Int. Cl.
| | | |
|---|---|---|
| *G02B 7/09* | (2006.01) | |
| *G02B 15/14* | (2006.01) | |
| *H04N 5/232* | (2006.01) | |
| *G06K 7/10* | (2006.01) | |
| *H04N 5/225* | (2006.01) | |

(52) U.S. Cl.
CPC ............. *G02B 7/09* (2013.01); *G02B 15/14* (2013.01); *G06K 7/10811* (2013.01); *G06K 7/10831* (2013.01); *H04N 5/2252* (2013.01); *H04N 5/2253* (2013.01); *H04N 5/2254* (2013.01); *H04N 5/23296* (2013.01)

(58) Field of Classification Search
USPC .................................................. 235/462.22
See application file for complete search history.

(56) References Cited

U.S. PATENT DOCUMENTS

| | | | | |
|---|---|---|---|---|
| 3,531,176 A | * | 9/1970 | Humphrey | G02B 27/646 356/149 |
| 4,644,143 A | * | 2/1987 | McJohnson | G06K 7/10861 235/385 |
| 5,473,149 A | | 12/1995 | Miwa et al. | |
| 5,756,981 A | * | 5/1998 | Roustaei | G03F 7/705 235/462.07 |
| 5,798,515 A | * | 8/1998 | Li | G06K 7/14 235/454 |

(Continued)

FOREIGN PATENT DOCUMENTS

WO    WO-2013125603 A1 *   8/2013   ........... G02B 15/167

OTHER PUBLICATIONS

International Search Report and Written Opinion for International Application No. PCT/US2018/053446 dated Dec. 27, 2018.

*Primary Examiner* — Rafferty D Kelly
(74) *Attorney, Agent, or Firm* — Yuri Astvatsaturov

(57) ABSTRACT

A method and apparatus for capturing an image of at least one object appearing in a field of view (FOV). A housing has an image sensor and a base lens assembly fixedly mounted relative thereto. A moveable lens assembly is movably mounted relative to the housing. The moveable lens, the base lens assembly, and the image sensor are aligned such that light received within the FOV passes through the moveable lens and the base lens assembly and impinges onto the image sensor. The light received from the FOV forms an original image prior to entering the movable lens and the base assembly. Light from the FOV impinging onto the sensor forms an impinging image.

22 Claims, 4 Drawing Sheets

(56) References Cited

U.S. PATENT DOCUMENTS 7,221,399 B2 5/2007 Fujita et al.
9,001,218 B2 * 4/2015 Ishizue .............. G02B 13/0035
348/208.11

* cited by examiner

IMAGING DEVICES HAVING PROGRESSIVE MAGNIFICATION

BACKGROUND OF THE INVENTION

Barcode and other scanning devices generally capture images within a given field of view (FOV). In some instances, it is desirable to capture images located at a far distance from the scanning device. Accordingly, these devices must be capable of functioning over a long working range while generating sharp images over a substantial portion of the working range.

Barcode or optical readers typically are unable to accommodate powerful (and therefore bulky) magnification or zooming systems due to the compact nature of the device. Further, the barcode or optical reader must be capable of minimizing image degradation while capturing images at a suitably high resolution when the desired scan object is located at a far distance from the barcode or optical reader. While some systems may address these and other issues via a combination of complicated electromechanical components which may be coupled with software correction, such systems are fairly complex and costly, and can adversely impact reliability of the device.

Accordingly, there is a need for improved systems, methods, and devices which address these issues.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
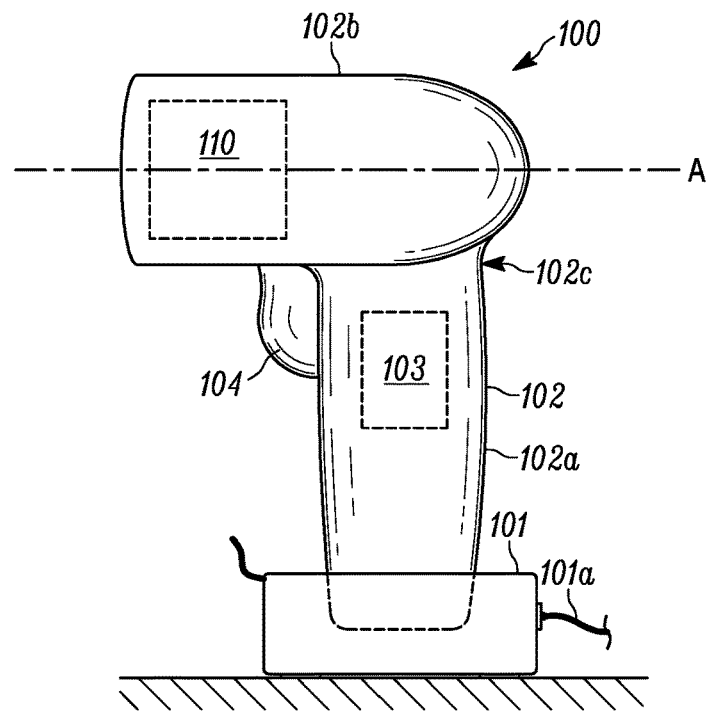
FIG. 1 is a schematic side elevation view of a barcode or optical reading device having a magnification system in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In an exemplary implementation, the present application provides an imaging assembly for capturing an image of at least one object appearing in a field of view (FOV). The assembly includes a housing having an image sensor and a base lens assembly each being fixedly mounted relative to the housing. The assembly further includes a moveable lens assembly that is movably mounted relative to the housing. The moveable lens, the base lens assembly, and the image sensor are aligned such that light received within the FOV passes through the moveable lens and the base lens assembly and impinges onto the image sensor. Prior to entering any one of the moveable lens and the base lens assembly, the light received from the FOV forms an original image. Further, the light received from the FOV that impinges onto the image sensor forms an impinging image. At least one of the moveable lens and the base lens assembly is operable to simultaneously magnify at a first magnification value and magnify at a second magnification value such that a first part of the impinging image is magnified at the first magnification value relative to the original image and a second part of the impinging image is magnified at the second magnification value relative to the original image.

In another exemplary implementation, the present disclosure includes an imaging scanner for capturing an image of at least one object appearing in a field of view. The imaging scanner includes a housing having an image sensor and a base lens assembly each being fixedly mounted relative to the housing. The imaging scanner further includes a moveable lens assembly that is movably mounted relative to the housing. The moveable lens, the base lens assembly, and the image sensor are aligned such that light received within the FOV passes through the moveable lens and the base lens assembly and impinges onto the image sensor. Prior to entering any one of the moveable lens and the base lens assembly, the light received within the FOV forms an original image, the light received from the FOV that impinges onto the image sensor forms an impinging image. The base lens assembly includes a first base lens having a first side that is at least partially concave and a second side that is at least partially both concave and convex.

In another exemplary implementation, the present disclosure includes a method of capturing an image of at least one object appearing in a field of view of an imaging device. A housing is provided, and an image sense and a base lens assembly are each fixedly mounted relative to the housing. A moveable lens is movably mounted relative to the housing. The moveable lens, the base lens assembly, and the image sensor are aligned such that light received from the FOV passes through the moveable lens and the base lens assembly, and impinges onto the image sensor. Prior to entering any one of the moveable lens and the base lens assembly, an original image is formed with the light received within the FOV. An impinging image is formed with the light received from the FOV that impinges onto the image sensor. At least one of the moveable lens and the base lens are simultaneously magnified at a first magnification value and a second magnification value such that a first part of the impinging image is magnified at the first magnification value relative to the original image and a second part of the impinging image is magnified at the second magnification value relative to the original image.

A first embodiment of an imaging-based bar code reader is shown schematically in FIGS. 1-5. The barcode or optical reading device 100 includes a housing 102, an imaging system 110 at least partially disposed within the housing 102 that includes a modular scan engine or imaging camera assembly. Specifically, the imaging system 110 includes an image sensor 112, a base lens assembly 120, and a moveable lens assembly 140. The device 100 may be adapted to be inserted into a docking station 101 which, in some examples, may include an AC power source 101a to provide power for the device 100. The device 103 may further include an onboard power supply 103 such as a battery, a trigger 104 that is used to activate the imaging system 110 to capture or scan a barcode, and a printed circuit board 106 which may accommodate a memory and a controller that controls operation of the imaging system 110. The device 100 may include any number of additional components such as decoding systems, processors, and/or circuitry coupled to the circuit board 106 to assist in operation of the device 100.

The housing 102 includes a gripping portion 102a to be grasped by an operator's hand and further includes a forward or reading head portion 102b extending from an upper part 102c of the gripping portion 102a. The reading head portion 102b supports the imaging system 110 within an interior region of the housing 102. The imaging system 110 may, but does not have to be, modular in it may be removed or inserted as a unit into the device 100, allowing the ready substitution of imaging systems 110 having different imaging characteristics, e.g., camera assemblies having different focal distances, working ranges, and fields of view (FOV). In some examples, the field of view may be static.

The image sensor 112 may have a plurality of photosensitive elements forming a substantially flat surface and may be fixedly mounted relative to the housing 102 using any number of components and/or approaches. The image sensor 112 further has a defined central imaging axis A that is normal to the substantially flat surface. In some embodiments, the imaging axis A is coaxial with a central axis of the base lens assembly 120 and the movable lens assembly 140. The base lens assembly 120 may also be fixedly mounted relative to the housing 102 using any number of components and/or approaches. In the illustrated embodiment, the base lens assembly 120 is positioned between the moveable lens assembly 140 and the image sensor 112. Other arrangements are possible.

Figure 2:
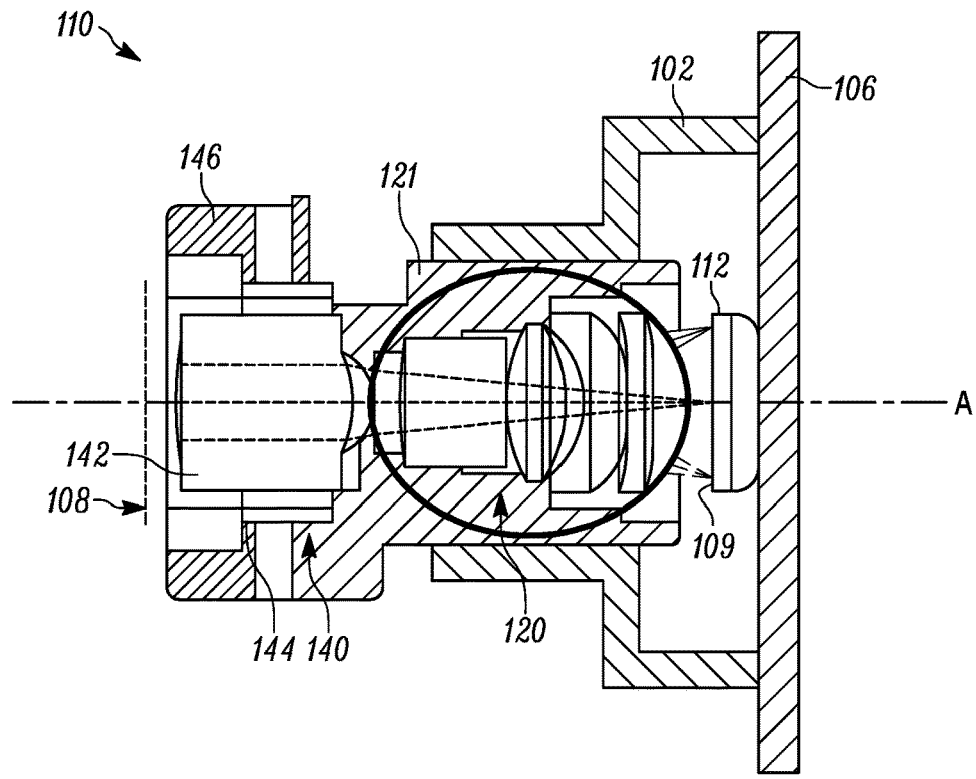
FIG. 2 is a cross-sectional side view of the barcode or optical reading device of FIG. 1 in accordance with some embodiments.
Figure 3:
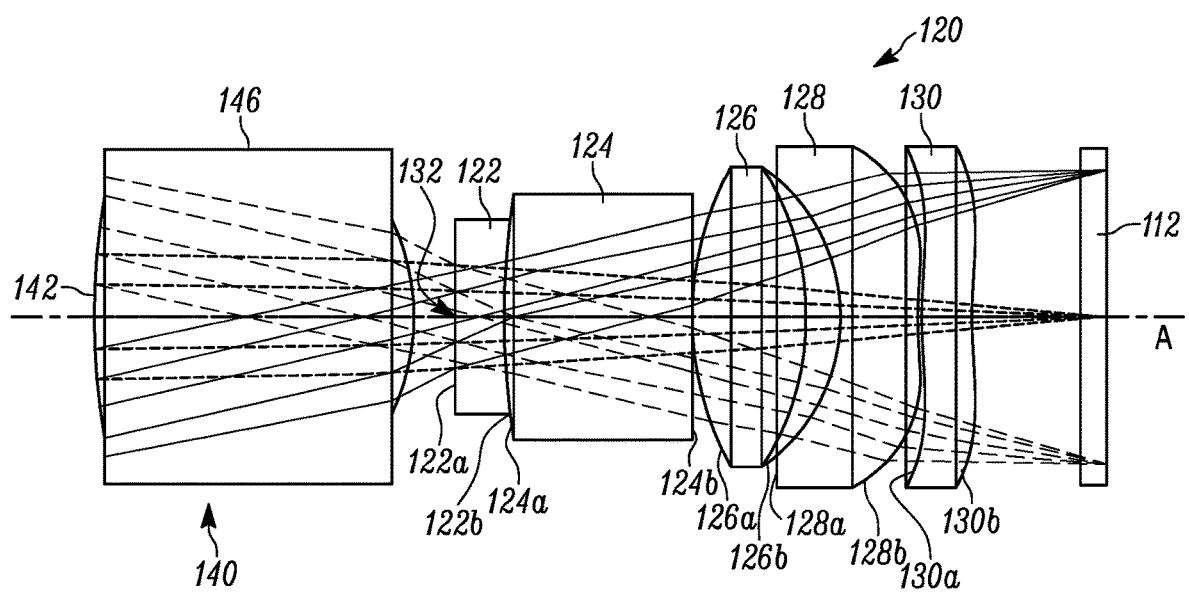
FIG. 3 is a cross-sectional side view of a lens unit of the barcode or optical reading device of FIGS. 1 and 2 in accordance with some embodiments.

As best seen in FIGS. 2 and 3, the base lens assembly 120 includes number of lens elements disposed in a lens holder 121: a first lens 122 having a first side or surface 122a and a second side or surface 122b, a second lens 124 having a first side or surface 124a and a second side or surface 124b, a third lens 126 having a first side or surface 126a and a second side or surface 126b, a fourth lens 128 having a first side or surface 128a and a second side or surface 128b, and a fifth lens 130 having a first side or surface 130a and a second side or surface 130b. An aperture 132 is disposed adjacent to the first surface 122a of the first lens 122. The base lens assembly 120 defines an optical axis that is approximately collinear with the central imaging axis 112 of the image sensor 112.

The moveable lens assembly 140, the base lens assembly 120, and the image sensor 112 are aligned such that light received from the field of view passes through movable lens assembly 140 to the aperture 132, the first surface 122a and the second surface 122b of the first lens 122, the first surface 124a and the second surface 124b of the second lens 124, the first surface 126a and the second surface 126b of the third lens 126, the first surface 128a and the second surface 128b of the fourth lens 128, the first surface 1130a and the second surface 130b of the fifth lens 130, and ultimately impinges onto the image sensor 112.

In the illustrated embodiment, the first lens 122 is an aspherical lens and can have a low Abbe value of approximately 25. The second lens 124 is a spherical lens and can be constructed from a high index material having an index of refraction of approximately 1.90. Further, the second lens 124 can have a low Abbe value of approximately 20. The third lens 126 is a spherical lens and can be constructed from a low index material having an index of refraction of approximately 1.49 and a high Abbe value of approximately 70. The fourth lens 128 is an aspherical lens and can have an Abbe value of approximately 56. Similarly, the fifth lens 130 is an aspherical lens and can have an Abbe value of approximately 26. Any one of the lenses may be made from plastic or glass, or any other sufficiently transparent material that is sufficient to achieve the desired image capture.

The third lens 126 can be used to provide a baseline optical power of the imaging system 110. The third lens 126 may be constructed from a glass material, and may bear a majority of the optical power of the base lens assembly 120. Generally, the index of refraction of glass material does not vary with temperature, and thus can provide a nearly constant focal distance of the base lens assembly 120 over wide range of temperatures. Accordingly, the moving lens assembly 140 need not compensate for variations in focal distance of the base lens assembly 140, and thus the entire moving range of the moving lens assembly 140 may be used for focusing of its useful range. This third lens 126 allows the imaging system 110 to be thermally stable, thereby allowing the imaging system 110 to be usable throughout a substantially entire moving range of the movable lens assembly 140. The fourth lens 128 and the fifth lens 130 provide lens barrel distortion while correcting field curvature. More specifically, at least a portion of the first surface 128a of the fourth lens 128 is concave, and at least a portion of the second surface 128a of the fourth lens 128 is both concave and convex. Further, at least a portion of the first surface 130a of the fifth lens 130 is both concave and convex, and at least a portion of the second surface 130b is both concave and convex.

The base lens assembly 120 may be modified as needed in various applications. The arrangement of the base lens assembly 120 may create barrel distortion and be used in conjunction with the movable lens assembly 140.

The moveable lens assembly 140 may be movably mounted relative to the housing 102 using any number of components or approaches. Generally, the movable lens assembly 140 is moveable along the central imaging axis A of the image sensor 112 and the optical axis of the base lens assembly 120. In some examples, the movable lens assembly 140 can move in the range of approximately 300 microns.

Figure 4:
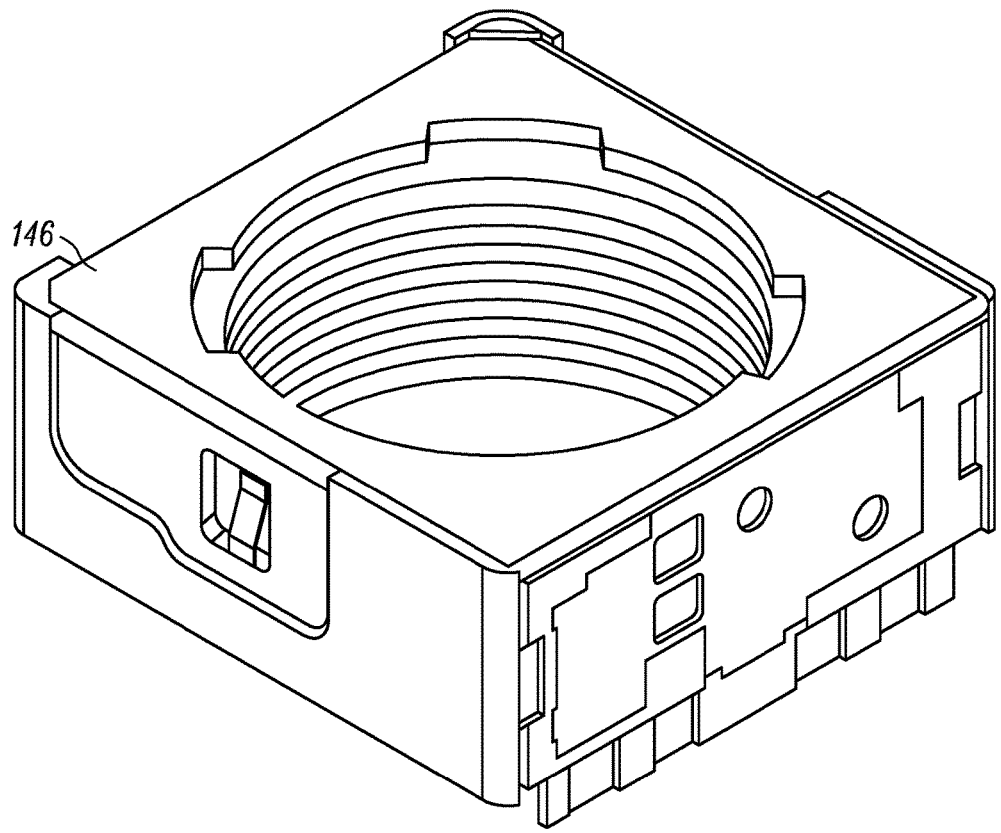
FIG. 4 is a perspective view of a motor for generating movement of a portion of the lens unit of FIG. 3 in accordance with some embodiments.
Figure 5:
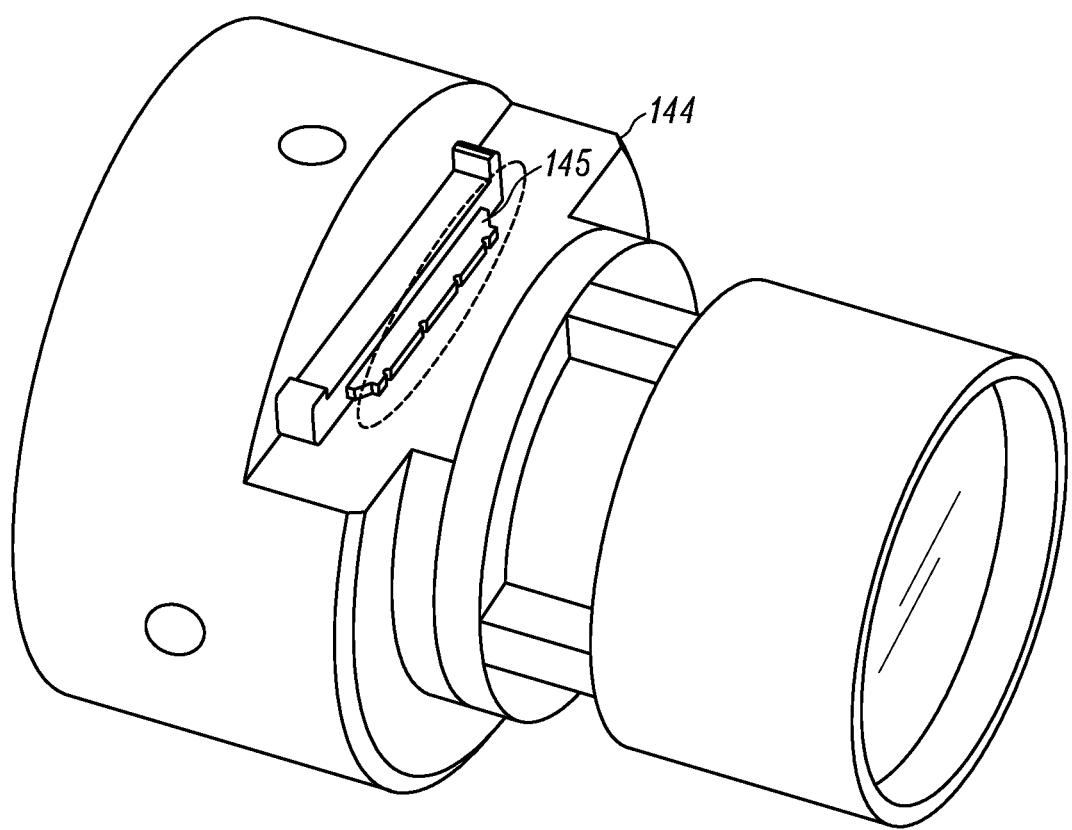
FIG. 5 is a perspective view of lens holder of the barcode or optical reading device of FIGS. 1-4 in accordance with some embodiments.

The movable lens assembly 140 includes a lens 142 which is coupled to a motor 144, such as a voice coil motor, a piezoelectric motor, or any other type of motor. The movable lens 142 can be constructed from a plastic and can have a high Abbe value of approximately 52, and has aspherical surfaces. The moveable lens 142 and the motor 144 may be mounted together in a lens holder 146 via a threaded connection as illustrated in FIG. 4. In other examples, the moveable lens 142 and the motor 144 may be directly mounted together in the lens holder 121 of the base lens assembly 120.

In the illustrated example, the lens holder 146 of the movable lens assembly 140 includes a connection for accessing electrical contacts to provide power to electrical contacts 145 of the motor 144. In some embodiments, the movable lens 142 may be constructed from any number of optical elements that move in conjunction with each other.

Figure 6:
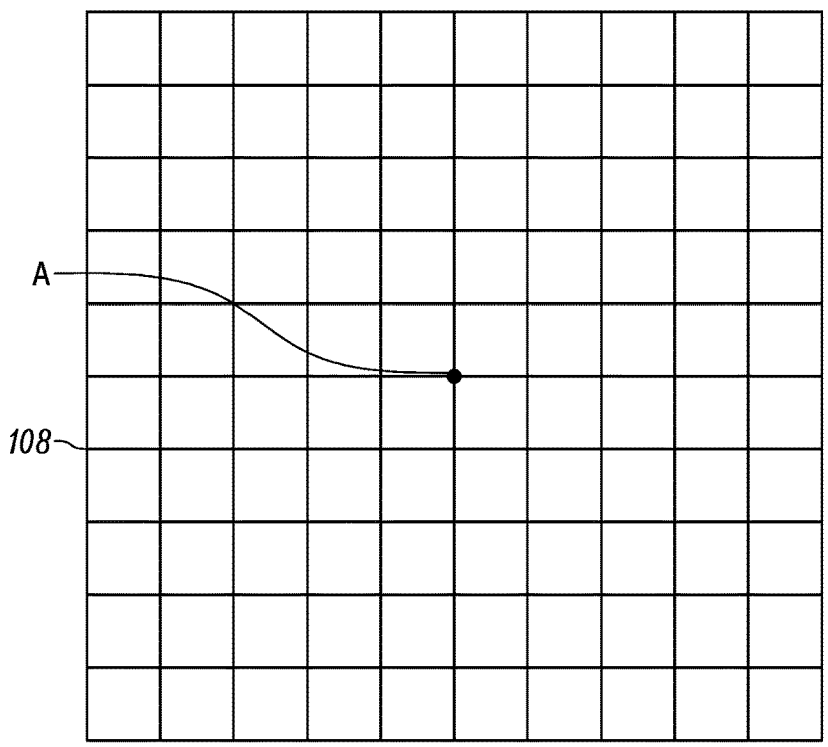
FIG. 6 is an illustration of an original image presented to the barcode or optical reading device of FIGS. 1-5 in accordance with some embodiments.
Figure 7:
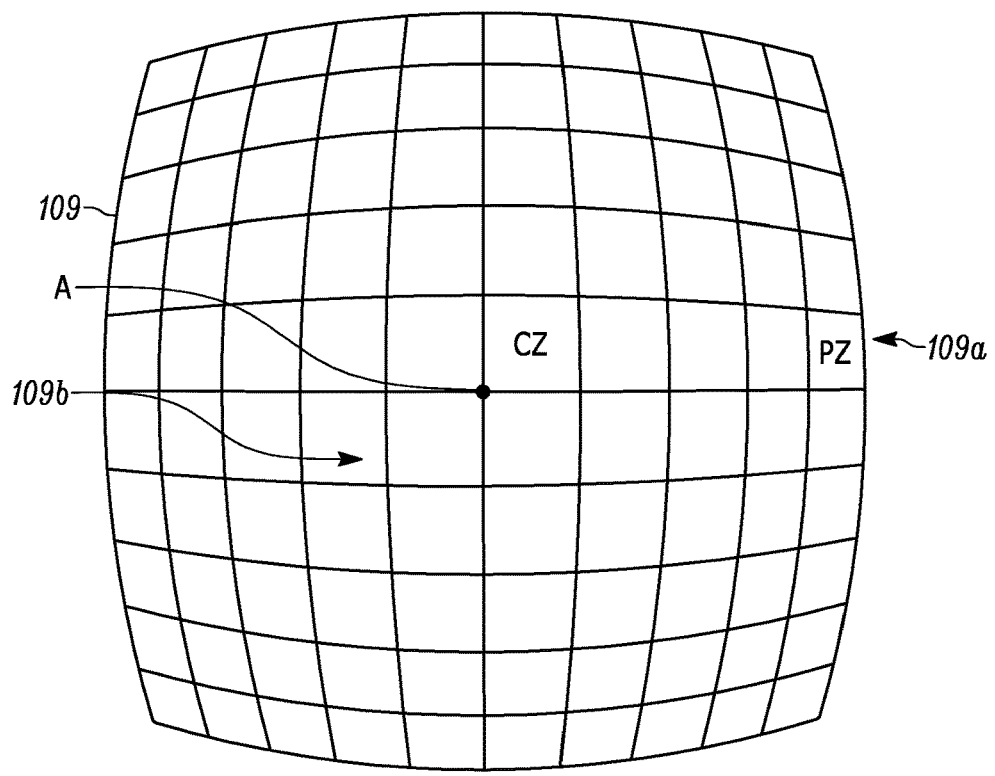
FIG. 7 is an illustration of an impinging image produced by the barcode or optical reading device of FIGS. 1-5 in accordance with some embodiments.

As previously stated, the moveable lens 140, the base lens assembly 120, and the image sensor 112 are aligned such that light received from within the field of view of the image sensor 112 passes through the moveable lens 140 and the base lens assembly 120 and subsequently impinges on the image sensor 112. In operation, upon a user activating the device 100 via the trigger 104 or any other component, prior to entering the moveable lens 140 or the base lens assembly 120, the light received from the field of view forms an original image 108 (as shown in FIGS. 2 and 6). As illustrated in FIGS. 2 and 7, the light received within the field of view that impinges onto the image sensor 112 forms an impinging image 109. Focusing is adjusted when moving or positioning the moveable lens 142 via the motor 144 relative to the base lens assembly 120. Movement of the moveable lens 142 may be achieved using a combination of electromechanical and software control devices and systems.

The moveable lens assembly 140 and/or the base lens assembly 120 are operable to simultaneously magnify the impinging image 109 at a first magnification value and a second magnification value. Specifically, as illustrated in FIG. 7, a first part 109a of the impinging image 109 (denoted as "PZ" or "peripheral zone" in FIG. 7) is magnified at the first value relative to the original image 108 (which lacks a magnification value), and a second part 109b of the impinging image 109 (denoted as "CZ" or "central zone" in FIG. 7) is magnified at the second magnification value relative to the original image 108. In the illustrated example, the second part 109b of the impinging image 109 is defined by the central imaging axis. In some examples, one or both of the fourth lens 128 and the fifth lens 130 at least partially cause the second part 109b of the impinging image 109 to be magnified relative to the original image 108 at the second magnification value. In some examples, the moving lens assembly 140 may be used to focus the impinging image 109, and the base lens assembly 120 may be used to provide magnification over the FOV.

The first magnification value and the second magnification value may be any appropriate value that is determined by desired characteristics of the device 100. For example, the second magnification value (which corresponds to the second part 109b of the impinging image 109) may be greater than the first magnification value corresponding to the first part 109a of the impinging image 109. In some examples, the first magnification value may provide a smaller magnification, and the second magnification value may provide a larger magnification. Further, in some embodiments, the imaging system 110 may provide a progressive magnification from the first part of the impinging image to the second part of the impinging image. For example, the magnification value may gradually increase from the peripheral zone to the central zone of the impinging image 109. Other examples are possible. For instance, in other configurations, a step may exist between the first and the second magnification levels.

So configured, the second part 109b of the impinging image 109 is magnified such that a centered barcode occupies more of the field of view of the image sensor 112 than it would otherwise. By zooming in on and magnifying the desired barcode, the barcode is captured on a larger part of the imaging sensor 112, allowing for a greater resolution of details, more sensor pixels can sample the barcode, which can assist the imaging system 110 in accurately reading the desired barcode by magnifying at least some of the details of the barcode. In some embodiments, the impinging image 109 may include a barrel distortion of approximately 30% relative to the original image. A negative barrel distortion can result in a wider field of view than a lens having no negative distortion and a similar axial optical resolution. Advantageously, the device 100 can take advantage of this negative barrel distortion to read wide barcodes located at short distances (e.g., approximately one foot) from the device 100. Conversely, the magnifying capabilities of the image system 110 allow smaller barcodes or higher density barcodes located at far distances (e.g., approximately 600 inches) to be better resolved to be scanned. Further, the moving lens 142 described herein can be constructed from lightweight materials which can allow the motor 144 to operate quickly, and thus can reduce focus times and improve the device efficiency.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. An imaging assembly for capturing an image of at least one object appearing in a field of view (FOV), the imaging assembly comprising:
    a housing;
    an image sensor fixedly mounted relative to the housing;
    a base lens assembly fixedly mounted relative to the housing; and
    a moveable lens movably mounted relative to the housing, wherein:
        the moveable lens, the base lens assembly, and the image sensor are aligned such that light received within the FOV (i) passes through the moveable lens and the base lens assembly, and (ii) impinges onto the image sensor;
        prior to entering any one of the moveable lens and the base lens assembly, the light received from the FOV forms an original image;
        the light received from the FOV that impinges onto the image sensor forms an impinging image; and
        at least one of the moveable lens and the base lens assembly is operable to simultaneously magnify at a first magnification value and magnify at a second magnification value such that a first part of the impinging image is magnified at the first magnification value relative to the original image and a second part of the impinging image is magnified at the second magnification value relative to the original image.

2. The imaging assembly of claim 1, wherein the base lens assembly is positioned between the moveable lens and the image sensor.

3. The imaging assembly of claim 1, wherein the moveable lens is moveable via a voice coil motor.

4. The imaging assembly of claim 3, wherein the base lens assembly and the voice coil motor are mounted at least partially within a lens holder.

5. The imaging assembly of claim 1, wherein the base lens assembly includes a base lens having a first side and a second side, the light received from the FOV passing through the first side and further through the second side, wherein at least a portion of the first side is concave, and wherein at least a portion of the second side is concave and convex.

6. The imaging assembly of claim 1, wherein the base lens assembly includes a base lens having a first side and a second side, the light received from the FOV passing through the first side and further through the second side, wherein at least a portion of the first side is concave and convex, and wherein at least a portion of the second side is concave and convex.

7. The imaging assembly of claim 1, wherein the base lens assembly includes:
    a first base lens having a first side and a second side, at least a portion of the first side of the first base lens being concave, at least a portion of the second side of the first base lens being concave and convex; and
    a second base lens having a first side and a second side, at least a portion of the first side of the second base lens being concave and convex, at least a portion of the second side of the second base lens being concave and convex.

8. The imaging assembly of claim 7, wherein the second base lens is positioned between the first base lens and the image sensor.

9. The imaging assembly of claim 1, wherein the impinging image includes a barrel distortion of about and including 30% relative to the original image.

10. The imaging assembly of claim 1,
    wherein the image sensor includes a central imaging axis that is normal to a surface of the image sensor that is exposed to the light received within the FOV, and
    wherein the at least one of the moveable lens and the base lens assembly is further operable to progressively magnify from the first part of the impinging image and the first magnification value to the second part of the impinging image and the second magnification value.

11. The imaging assembly of claim 10, wherein the second part of the impinging image is defined by central imaging axis, and wherein the second magnification value is greater than the first magnification value.

12. The imaging assembly of claim 1, wherein the first magnification value provides a negative magnification, and wherein the second magnification value provides a positive magnification.

13. The imaging assembly of claim 1, wherein the FOV is static.

14. An imaging scanner for capturing an image of at least one object appearing in a field of view (FOV), the imaging scanner comprising:
a housing;
an image sensor fixedly mounted relative to the housing;
a base lens assembly fixedly mounted relative to the housing; and
a moveable lens movably mounted relative to the housing, wherein:
the moveable lens, the base lens assembly, and the image sensor are aligned such that light received from the FOV (i) passes through the moveable lens and the base lens assembly, and (ii) impinges onto the image sensor;
prior to entering any one of the moveable lens and the base lens assembly, the light received within the FOV forms an original image;
the light received from the FOV that impinges onto the image sensor forms an impinging image; and
the base lens assembly includes a first base lens having a first side that is at least partially concave and a second side that is at least partially both concave and convex.

15. The imaging scanner of claim 14, wherein the first base lens is configured to at least partially cause a first part of the impinging image to be magnified relative to the original image at a first magnification value, and wherein the first base lens is further configured to at least partially cause a second part of the impinging image to be magnified relative to the original image at a second magnification value.

16. The imaging scanner of claim 15, wherein the first magnification value provides a negative magnification, and wherein the second magnification value provides a positive magnification.

17. The imaging scanner of claim 14, wherein the FOV is static.

18. The imaging scanner of claim 14, wherein the image sensor includes a central imaging axis that is normal to a surface of the image sensor that is exposed to the light received from the FOV, and
wherein at least one of the moveable lens and the base lens assembly is operable to progressively magnify from a first part of the impinging image to a second part of the impinging image, the first part of the impinging image being magnified at a first magnification value relative to the original image and the second part of the impinging image being magnified at a second magnification value relative to the original image.

19. The imaging scanner of claim 14, wherein the second part of the impinging image is defined by central imaging axis, and wherein the second magnification value is greater than the first magnification value.

20. A method of capturing an image of at least one object appearing in a field of view (FOV) of an imaging device, the method comprising:
providing a housing;
fixedly mounting an image sensor relative to the housing;
fixedly mounting a base lens assembly relative to the housing;
movably mounting a moveable lens relative to the housing;
aligning the moveable lens, the base lens assembly, and the image sensor such that light received within the FOV (i) passes through the moveable lens and the base lens assembly, and (ii) impinges onto the image sensor;
prior to entering any one of the moveable lens and the base lens assembly, forming an original image with the light received from the FOV;
forming an impinging image with the light impinging onto the image sensor; and
simultaneously magnifying the original image via at least one of the moveable lens and the base lens assembly at a first magnification value and a second magnification value such that a first part of the impinging image is magnified at the first magnification value relative to the original image and a second part of the impinging image is magnified at the second magnification value relative to the original image.

21. The method of claim 20, further comprising positioning the base lens assembly between the moveable lens and the imaging sensor.

22. The method of claim 20, wherein the base lens assembly and the voice coil motor are mounted at least partially within a lens holder.

* * * * *